(12) United States Patent
    Dreher

(10) Patent No.: US 10,995,744 B1
(45) Date of Patent: May 4, 2021

(54) MOVING EFFORT FORCE POINT ON A PUMPING UNIT

(71) Applicant: George R Dreher, Midland, TX (US)

(72) Inventor: George R Dreher, Midland, TX (US)

( * ) Notice: Subject to any disclaimer, the term of this patent is extended or adjusted under 35 U.S.C. 154(b) by 0 days.

(21) Appl. No.: 17/100,908

(22) Filed: Nov. 22, 2020

(51) Int. Cl.
*E21B 47/00* (2012.01)
*E21B 43/12* (2006.01)
*F04B 47/02* (2006.01)
*F16H 21/22* (2006.01)

(52) U.S. Cl.
CPC .......... *F04B 47/028* (2013.01); *E21B 43/127* (2013.01); *E21B 47/00* (2013.01); *F04B 47/022* (2013.01); *F16H 21/22* (2013.01)

(58) Field of Classification Search
CPC .. E21B 43/127; E21B 47/009; E21B 41/0085; F04B 47/14; F04B 47/026; F01B 9/02; F16H 21/18; F16H 29/02
See application file for complete search history.

(56) References Cited

U.S. PATENT DOCUMENTS

| | | | | |
|---|---|---|---|---|
| 1,895,181 A * | 1/1933 | Trout | ...................... | F04B 47/02 74/41 |
| 2,134,326 A * | 10/1938 | De La Mater | ........ | F04B 47/028 74/41 |
| 2,155,174 A * | 4/1939 | Trout | ...................... | F04B 47/14 74/591 |
| 2,179,649 A * | 11/1939 | Fincher | .................... | F04B 47/02 74/41 |
| 2,204,725 A * | 6/1940 | Crites | ................... | E21B 43/127 74/581 |
| 2,210,661 A * | 8/1940 | Fincher | .................. | F04B 47/02 74/593 |
| 2,213,646 A * | 9/1940 | Butcher | .................. | F04B 47/14 74/591 |
| 2,232,245 A * | 2/1941 | Kinney | .................. | A63H 19/24 246/85 |
| 2,294,094 A * | 8/1942 | O'Leary | ................. | F04B 47/02 74/591 |
| 2,915,919 A * | 12/1959 | Mitchell | ................. | G01M 1/36 74/590 |
| 2,958,237 A * | 11/1960 | Johnson | .................. | F16H 21/42 74/522 |
| 3,310,988 A * | 3/1967 | Gault | ...................... | F04B 47/02 74/41 |
| 3,364,755 A * | 1/1968 | Miller | ..................... | F16H 33/02 74/41 |

(Continued)

*Primary Examiner* — Daniel P Stephenson

(57) ABSTRACT

Embodiments of the present invention relate to lifting and lowering loads more efficiently and also more economically than known systems. This invention is the continuous movement by mechanical means of a moving effort force point to a desired advantageous position at a desired advantageous moment to achieve a desired low torque factor for a reduced net torque when lifting or lowering an unbalanced load with a beam with a fulcrum and connected to a load and an effort. One embodiment, a walking beam well pumping unit, the lifting and lowering of the well load can be caused by the reciprocating motion of a beam tipping on a fulcrum and with a moving effort force point. Potentially reduced net torque might allow longer life speed reducers, smaller speed reducers, and longer reciprocating vertical stroke length.

19 Claims, 11 Drawing Sheets

(56) References Cited

U.S. PATENT DOCUMENTS

| | | | | |
|---|---|---|---|---|
| 3,406,581 | A * | 10/1968 | Eyler | F04B 47/02 74/41 |
| 4,490,094 | A * | 12/1984 | Gibbs | F04B 47/02 417/42 |
| 4,681,515 | A * | 7/1987 | Allen | F04B 47/022 417/218 |
| 7,406,887 | B2 * | 8/2008 | Jensen | F04B 47/022 185/33 |
| 10,107,282 | B1 * | 10/2018 | Dreher | F04B 47/145 |
| 10,202,973 | B1 * | 2/2019 | Dreher | E21B 43/127 |
| 10,340,755 | B1 * | 7/2019 | Dreher | F01B 9/02 |
| 10,577,904 | B1 * | 3/2020 | Dreher | E21B 43/127 |

* cited by examiner

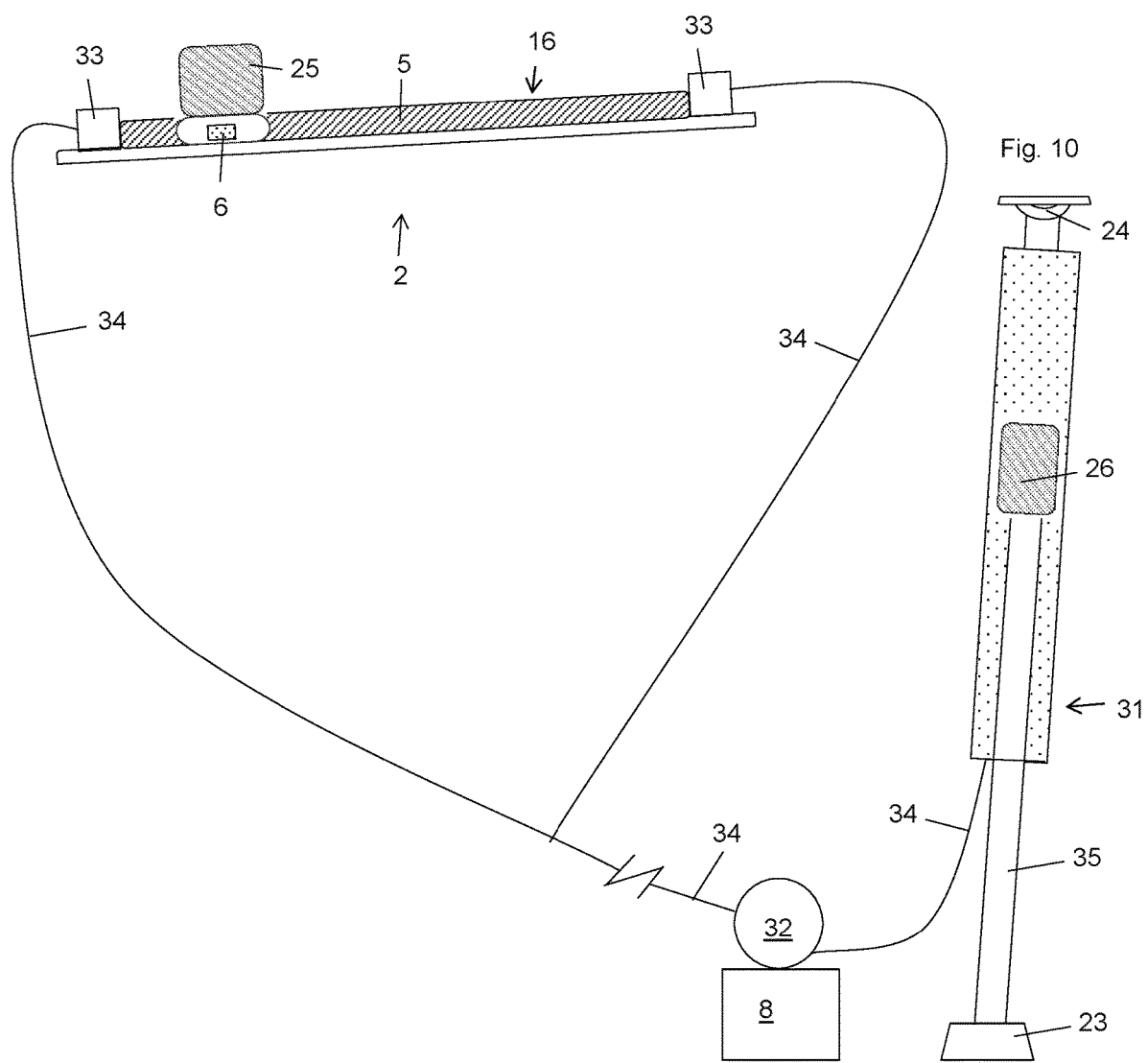

MOVING EFFORT FORCE POINT ON A PUMPING UNIT

CROSS-REFERENCE TO RELATED APPLICATIONS

This application claims priority to and the benefit of the filing of U.S. Provisional Patent Application No. 62/411,556, filed on Oct. 22, 2016; U.S. Provisional Patent Application No. 62/403,165, filed on Oct. 2, 2016; U.S. Provisional Patent Application No. 62/421,410, filed on Nov. 14, 2016; U.S. Provisional Patent Application Ser. No. 62/426,337, filed on Nov. 25, 2016; U.S. Provisional Patent Application Ser. No. 62/535,846, filed on Jul. 22, 2017; U.S. Provisional Patent Application Ser. No. 62/535,945, filed on Jul. 23, 2017; and U.S. Non-Provisional patent application Ser. No. 15/719,964, filed on Sep. 29, 2017; U.S. Non-Provisional patent application Ser. No. 15/789,760, filed on Oct. 20, 2017; U.S. Non-Provisional patent application Ser. No. 15/810,083, filed on Nov. 12, 2017; U.S. Non-Provisional patent application Ser. No. 16/130,068, filed on Sep. 13, 2018; Non-Provisional patent application Ser. No. 16/709,679, filed on Dec. 10, 2019; Non-Provisional patent application Ser. No. 16/709,815, filed on Dec. 10, 2019; and the specifications and claims (if any) thereof are incorporated herein by reference.

BACKGROUND OF THE INVENTION

Field of the Invention (Technical Field)

Embodiments of the present invention relate generally to improved efficiency for lifting and lowering unbalanced loads.

DESCRIPTION OF RELATED ART

Lifting and lowering of loads has often been facilitated with the use of counterweight (counterbalance) to offset the load, in a manner to reduce the required force to raise and lower the load with the counterweight to be in some state of balance. Whether as in the intentionally unbalanced state, for example, in the Trebuchet beam, a fulcrum machine where a counterweight heavier than the load causes a beam with a fulcrum point to hurl a missile projectile from the opposite lighter beam end when the much heavier counterweight end drops; or in intentionally balanced modes, for example, an elevator, or a beam well pumping unit, often referred to as a "pump jack", the term "net force" or other synonyms can be used to describe a quantity of positive or negative force required to raise or lower a load after factoring in an attempt to balance or unbalance with counterweight in order to lighten or increase the load. "Gross torque" and other synonyms can be used to describe a quantity of torque required to raise or lower a load without or before an attempt to balance or unbalance with a counterweight—for example, a weight lifting exercise machine whose very purpose is to be heavy.

Gravity is the natural force being countered with the machine's counterbalance force, so with a fixed amount of load and fixed amount of counterweight the machine's required force is relatively constant. Some designs have attempted to improve lifting efficiency in various ways: by varying the angles of pull in the pulling machine, varying the length of linkages in the pulling machine, varying the size of pulleys in the pulling machine, and/or varying the speed reduction of pull in the pulling machine. In the case of beam pumping units which raise and lower a more or less vertical load there is a tipping (fulcrum) point and counterweight effort and load is intended to be in a close state of balance.

Machines designed to do heavy lifting are big and expensive and repairs on worn parts are expensive. The less force that is needed to accomplish the desired work, the smaller the machine components can be, and the less energy can be consumed accomplishing the work, and the less wear and tear on the machine occurs, and all this results in less expense to operate the machine, so designers have tried force-reducing designs in order to improve the economics of the lifting work.

Now we describe some design attempts to reduce the required lifting forces that are variations of both adjustable crank weight and beam weight "conventional" center tipping (fulcrum point) class 1 lever geometry and class 3 lever geometry (rear tipping-fulcrum point) that have attempted to reduce required counterweight in beam well pumping which in operation converts rotary motion of the prime mover, speed reducer, and crank arms, to vertical reciprocating motion of the pitman arms connected to the beam in order to facilitate rod pumping. Besides conventional class 1 geometry these variations can be front-mounted with rear fulcrum points as a class 3 lever, as in the first 1920s air balance units which still use air cylinder pressure as counterweight, and Parkersburg's "Monkey Motion" with fourteen bearing points which was entirely beam weighted with no crank arm weights which made the larger size beam weights bulky. However, both these designs allow more constant effective counterbalance than crank weighted with rotary motion counterweights as used in the 1930s "grasshopper" (Mark II) with class 3 rear fulcrum.

Deeper wells required more counterweight so massive units came of age in the early 1970s when the first sales order for the Mark II 1280 for Union Oil well in Farnsworth, Tex., was obtained by E. L. Hudson which started the era of massive crank weight pumping units when the Mark II's inventor Walter Trout instructed his engineer Joe Byrd to further refine the grasshopper design to accept the largest phased crank counterweight unit ever, and so came the first Mark II 1280.

One problem is that in beam pumped wells the lifted weight is about 1.5 times the weight of the lowered weight due to lifting the weight of the fluid plus the buoyant weight of the sucker rods in the pipe when lifting, but the fluid weight is then held by the downhole pump standing valve when lowered making lifting and lowering unbalanced, so in known references, the difference in counterweight required is split on the up stroke and down stroke which leaves significant unresolved net torque due to the unsolved unbalanced downhole condition.

With conventional beam units, massive effective counterweight is achieved with leverage of adjustable crank weight. But purely beam weighted units were built by Parkersburg and Cabot and others because the effective beam weight is direct and is more constant than rotary crank weight.

A phased crank design for conventional beam unit with class 1 lever center fulcrum point was published by George Eyler and Cabot Corporation in 1963. And an advanced geometry design was published by Bob Gault and Bethlehem Supply in 1965. These design elements require operating the unit in one direction only and mainly address effective counterweight applied to torque factor, which is a crank angle based multiplier from unit geometry that affects torque calculation at the speed reducer, and sometimes is able to reduce torque over "conventional" designs.

But, the air balance design can reverse direction and the gear teeth in the speed reducer are known for long life. This is partly because with easily adjusted air pressure the counterweight balance is easily maintained close to equal on upstroke and downstroke.

In 1984, Sam Gibbs introduced a wave equation that allowed well controllers to shut off pumping units when fluid in the well bore was low. Thus, variable frequency drives were introduced to seek better efficiency by slowing the pumping units or shutting them off when fluid in the well bore was low. This has led to many other intelligent controllers including speed controllers and soft reversing mechanisms.

All the designs mentioned can achieve a fairly limited increase in efficiency but still leave the problem of downhole unbalanced weight between lifting and lowering. So, there's much room for improvement—including the need for much greater efficiency regarding reduction of torque and net torque, in order to achieve longer lasting components, and reduced operating expense, reduced power consumption, longer stroke lengths and smaller speed reducers.

Some Noteworthy Patents:

| Pat. No. | Date | Inventor | Class |
|---|---|---|---|
| 1,895,181 | Jan. 23, 1933 | W.C. TROUT | |
| 2,134,326 | Oct. 25, 1938 | R.G. DE LA MATER | 74-41 |
| 2,155,174 | Apr. 18, 1939 | W.C. TROUT | 74-591 |
| 2,179,649 | May 4, 1939 | W.C. TROUT ET AL | 74-41 |
| 2,210,661 | Sep. 6, 1940 | J.L. FINCHER/LUFKIN | 74-593 |
| 2,213,646 | Sep. 30, 1940 | A.M. BUTCHER | |
| 2,232,245 | Feb. 25, 1941 | R.G. DELAMATER | 74-539 |
| 2,293,915 | Sep. 25, 1942 | E.W. PATTERSON | 74-589 |
| 2,915,919 | Dec. 8, 1959 | C.C. MITCHELL | 74-590 |
| 3,310,988 | Mar. 28, 1967 | R.H. GAULT | 74-41 |
| 3,406,581 | Oct. 22, 1968 | G. EYLER | 74-41 |
| 4,490,094 | Dec. 25, 1984 | S.G. GIBBS | 417/42, 417/22X, 417/53X, 22-24 |

BRIEF SUMMARY OF EMBODIMENTS OF THE PRESENT INVENTION

Embodiments of the present invention relate to lifting and lowering loads more efficiently and also more economically than known systems. This invention is the continuous movement by mechanical means of a moving effort force point to a desired advantageous position at a desired advantageous moment to achieve a desired low torque factor for a reduced net torque when lifting or lowering an unbalanced load with a beam with a fulcrum and connected to a load and an effort.

In one embodiment, a walking beam well pumping unit, the lifting and lowering of the well load can be caused by the reciprocating motion of a beam tipping on a fulcrum and with a moving effort force point.

Potentially reduced net torque might allow longer life speed reducers, smaller speed reducers, and longer reciprocating vertical stroke length and these are both economic and performance benefits.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 9, rodless air piston positioning drive with air lines.

FIG. 10, beam air compressor with air lines, air ports, air reserve tank, and optional auxiliary air compressor or hydraulic pump.

DESCRIPTIVE KEY

Figure 1:
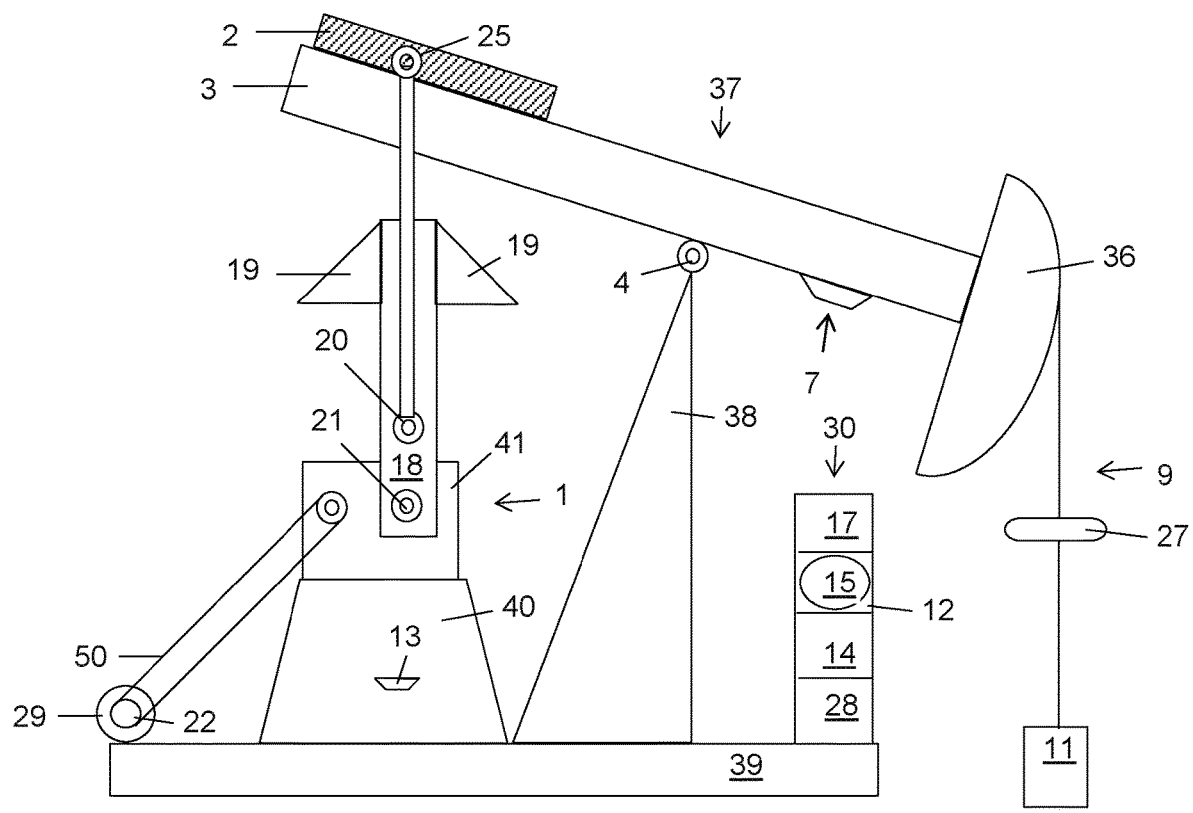
FIG. 1, moving effort force point positioning drive mounted top of beam with crank arm at 0 degrees.
Figure 2:
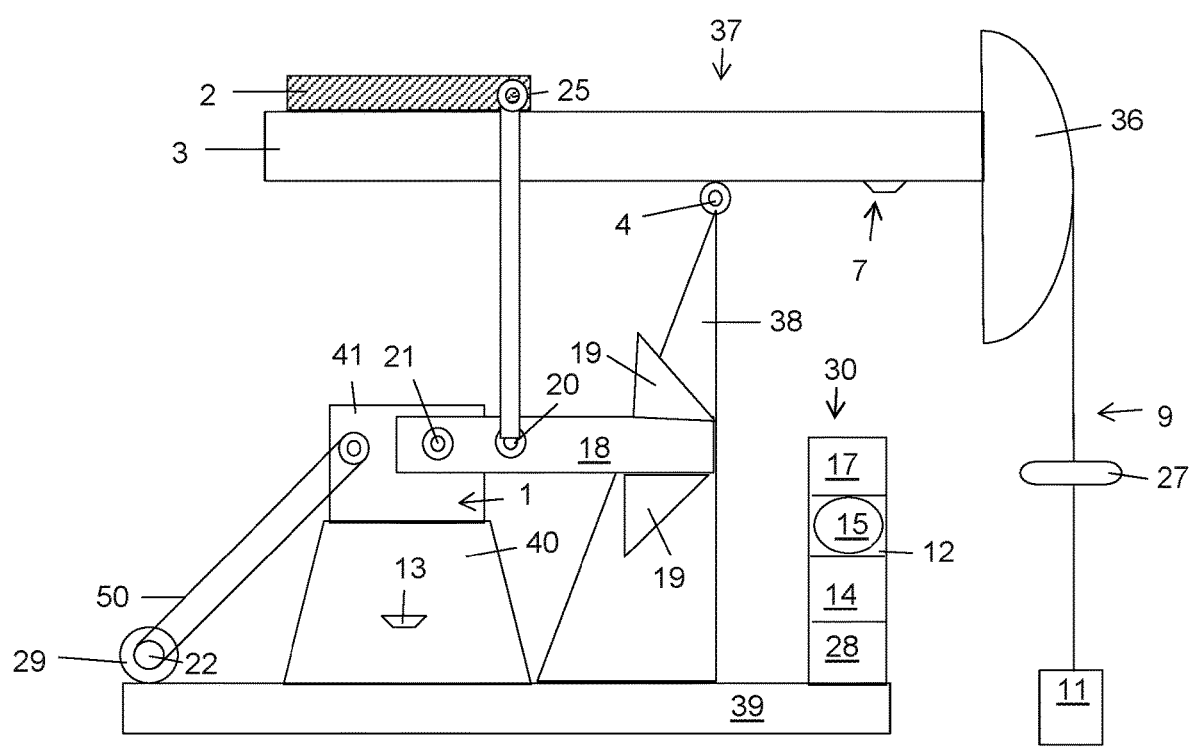
FIG. 2, moving effort force point positioning drive mounted top of beam with crank arm at 90 degrees.

1 torque (force)
2 positioning drive
3 reciprocating walking beam (lever)
4 fulcrum (tipping point)
5 carriage (for rodless piston)
6 element (rodless piston)
7 beam angle sensor (inclinometer connected to system controller)
8 air compressor (or hydraulic pump connected to reserve tank)
9 well load
10 crankweight load
11 well
12 memory module
13 crank position sensor (magnet-transducer connected to system controller)
14 system logic controller
15 display
16 double acting rodless cylinder (drive positioning assembly)
17 ammeter (connected to prime mover)
18 crank arm
19 crank weight
20 crank pin (of crank arm)
21 crankshaft (of speed reducer)
22 motor sensor (connected to system controller)
23 piston foot
24 cylinder bearing 25 moving effort force point
26 piston
27 load cell (sensor connected to system controller)
28 VFD (variable frequency drive connected to prime mover)
29 prime mover (connected to VFD and ammeter)
30 system controller (connected to sensors/positioning selection mechanism)
31 beam air compressor (with air hose to air reserve tank)
32 air reserve tank (with air hose to rodless cylinder and beam air compressor)
33 air-port (with air valve and air hose to air reserve tank/drive positioning mechanism)
34 air line
35 piston rod
36 horse head
37 beam pumping unit (conventional class 1 lever with invention)
38 samson post
39 runner
40 speed reducer pedestal
41 speed reducer
42 electric motor
43 enclosure mount
44 coupling
45 bearing
46 screw
47 slide
48 table
49 sensor
50 v-belts (from prime mover to unit sheave)
51 rack
52 pinion
53 motor pulley
54 pinion pulley

DETAILED DESCRIPTION OF THE INVENTION

As used throughout this application, the term "counterbalance" is intended to mean the amount of effective weight the dead weight of the block of steel called "counterweight" 10 must exert to effect a desired result on a well load 9. The term "weight" and "dead weight" when referring to a "counterweight" 10, is used for the sake of simplicity and is not intended to limit the "counterweight" 10, instead, the term "weight" and "dead weight" when used in the context of the "counterweight" 10 is intended to include any and all manners of a "counterweight" 10, including but not limited to reciprocating counterweight, counter weight and counterweight.

As used throughout this application, the term "net torque" is intended to mean the amount of torque that speed reducer 41 or prime mover 29 must exert to effect a desired result on a well load 9.

As used throughout this application, the term "torque factor" is defined in API Specification 11E, Appendix C, "The torque factor for any given crank angle is the factor that, when multiplied by the load 9 in pounds at the polished rod, gives the torque 1 in inch-pounds at the crankshaft 21 of the pumping unit speed reducer 41."

As used throughout this application, the term "Permissible Load" is the polished rod load 9 necessary to give a resultant net torque 1 equal to the API rating of the speed reducer 41 with a certain amount of counterbalance 10. This load should be calculated for each 15 degree crank position.

As used throughout this application, the term "unbalanced load" on a beam pumping unit 37 is intended to mean where the load 9 in the lift direction exceeds the load 9 in the return direction.

In accordance with embodiments of the invention, the best mode is presented in terms of the described embodiments, herein depicted within FIG. 1 through FIG. 12. However, the disclosure is not limited to the described embodiments and, upon studying the instant application, a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. It should also be understood that the sizes and relative orientations of the illustrated elements are not shown to scale, and in some instances they have been exaggerated for purposes of explanation.

Embodiments of the present invention can be used in conjunction with the four bar mechanism and linked to work as a reciprocating rod pump.

We are describing an invention which is an apparatus used to reciprocate a downhole rod pump connected to the surface by a rod or rods for the purpose of lifting fluid from a well bore This invention is an apparatus which is uniquely comprised of a moving effort force point 25.

Of the many applications that embodiments of the present invention apply to, now consider an embodiment of the present invention as applied to class 1 lever, in this particular example conventional crank weight walking beam 3 pumping unit 37 where circular motion is transferred from prime mover 29 to speed reducer 41 and rotating crank arm 18 and then converted to linear motion with crank arm 18 crank pin 20 articulated with moving effort force point 25 to walking beam 3 at the moving effort force point 25, and with this teaching speed reducer 41 net torque and prime mover 29 net torque is reduced by a moving effort force point 25 lowering the torque factor on both adjustable crank weight beam pumping units 37 and beam weight only units.

This device reduces the current problem of high net torque needed to lift and lower the unsolved unbalanced well load 9 in the current practice, by teaching a position-changing moving effort force point 25 whose structurally determined and timed vertical position in reference to the crank pin 20 either forward or aft of the speed reducer crankshaft 21 reduces lifting or lowering net torque 1 when the walking beam 3 pumping unit 37 crank arms 18 rotate.

For beam counterweighted walking beam 3 pumping units 37, load prediction calculations are directly proportional to the effective counterbalance. And calculations for rotary counterweight pumping units can include the API 11E standard equation for calculating net speed reducer 41 torque which is:

$$TN = TF(W-B) - M \sin \theta$$

Where;

$\theta$ = Angle of crank arm 18 rotation in a clockwise direction viewed with the wellhead to the right and with zero degrees occurring at 12 o'clock degrees, TF = torque factor for a given crank angle (from manufacturer's tables or computed from geometric measurements), B = structural unbalance (from manufacturer or measured), Tn = Net torque, inch-pounds, at the crankshaft for a given crank angle $\theta$, W = polished rod load at any specific crank angle $\theta$, M = maximum moment of the rotary counterweights (from manufacturer or computed from measurements), With these input values Tn=net torque are computed.

The rotational motion of crank arm 18 causes a maximum moment of rotary crank arm 18 weight, crank shaft, and crank pin 20 about the crankshaft whose standard nomenclature is written in thousands of inch-pounds. That maximum moment is nominally the position of the maximum effective crank arm 18 counterbalance at a little less than 90 degrees and a little less than 270 degrees. 90 degrees and 270 degrees is nominally the position of maximum net torque and maximum requirement for counterbalance effect. So when the moving effort force 25 remains vertically oriented with the crank pin 20 it is decreasing the torque factor to compensate and offset the maximum net torque requirement in the horizontal crank arm 18 position.

A moving effort force point 25 can be retrofitted and installed on already existing units on the existing well installations by using attaching methods such as but not limited to bolts, rivets, weld, and other suitable methods.

And the moving effort force point 25 is desirable to be incorporated in original equipment manufacturing, OEM, on newly manufactured walking beam 3 pumping units 37. Both retrofitted and OEM can employ user discretion to fit the particular specific operational design parameters.

Retrofitted and OEM walking beam 3 pumping units 37 utilizing this invention can potentially allow for longer beam pump stroke lengths and smaller torque capacity speed reducers 13 than those of current practice in known systems because of the increased efficiency with moving effort force point 25 position effectively reducing the required lifting and lowering net torque.

And also with those longer strokes walking beam 3 pump can operate at slower strokes per minute, and also allow the use of reduced prime mover 29 horsepower, so new beam pumping unit 37 designs will want to accommodate the benefits of this invention, where:

Load×Distance from tipping point=Counterweight Mass×Distance from tipping point and is called load moment.

Current practice rule of thumb ECB (effective counterbalance)~Bouyant weight of rods+½ fluid load on pump plunger.

Lowest speed reducer 41 torque loads on walking beam 3 pumping units 37 occur at top and bottom of stroke, 0 degrees and 180 degrees, because of low torque factor from unit geometry. And nominal peak speed reducer torque loads occur at high torque factor at about 90 degrees and about 270 degree crank arm 18 angles which values are desired to be equal when the walking beam 3 pump is balanced in the field at the well using current practice in known systems.

Negative torque caused by deliberate unbalance is electrically regenerative and some negative unbalance may occur when intentionally reducing torque, but negative unbalance can reach diminishing benefits above speed reducer 25 torque rating so the recommended control parameters will limit negative torque to be within speed reducer 25 torque rating. Subsequent operating manuals can address details of these and other operational aspects, where:

Net torque ($Tn$)=9.53×kilowatt (kw)×efficiency (eff)/ strokes per minute (SPM)×speed variation of power transmission ($SV$).

Torque factor (TF) is used to convert polished rod load to torque (Nm).

Torque due to net well load ($TWN$)=torque factor (TF)×well load ($WN$).

Net well load ($WN$)=well load ($W$)−unit unbalance ($SU$).

FIG. 1 to FIG. 8 illustrate an embodiment wherein well 11 is pumped by beam 3, which lifts load 9, which in this particular example is about 1.5 times greater than that of load 9 when it is in its lowered position. This is due to lifting the weight of the fluid plus the buoyant weight of the sucker rods in the pipe when lifting up, but that weight is then held by the well tubing in the downhole pump standing valve when being lowered. Thus, in known systems, the difference in load 9 is more or less split on the up stroke and down stroke which leaves a state of significant net torque 1 on prime mover 29 and net gear torque in in the speed reducer 41, due to the remaining unsolved unbalanced condition. Embodiments of the present invention reduce the problem of these high net torque 1 needed to lift and lower load 9 and crank weight 19 at effort point 25 with a moving effort force point 25 whose position on beam 3 reduces torque factor and thus lifting and lowering net torque 1. In one embodiment, prime mover 29 can include but is not limited to an electric motor, an internal combustion engine, a hydraulic motor, combinations thereof and the like. Most preferably, the moving effort force point 25 is positioned substantially vertical to the crank pin 20 so that it becomes an intelligent force-reducing adjustable double-acting torque factor limiter. In this embodiment, moving effort force point 25 intelligently changes position on beam 3 to be positioned substantially vertical to the crank pin 20 where it can best cause the most reduction in net torque 1 that is required to lift and lower load 9 and/or crank weight load 10 at moving effort force point 25. In this embodiment, FIG. 1 to FIG. 8 illustrate a class 1 lever having beam 3 that pumps with adjustable crank weights 19 and moving effort force point 25.

FIG. 1 to FIG. 8 illustrate that of the many applications that embodiments of the present invention can apply to, we now consider an embodiment of the present invention as applied to class 1 lever—for example conventional crank weight pumping unit 37 as applied to a reciprocating beam pump, where circular motion is transferred from prime mover 29 to speed reducer 41 and then converted to linear motion with a pitman that is connected from crank pin 20 to effort force point 25 of beam 3 and net torque 1 is reduced by positioning moving effort force point 25. Beam weighted units in this description will not be drawn separately because they operate similar to conventional crank weight pumping unit 37.

Figure 3:
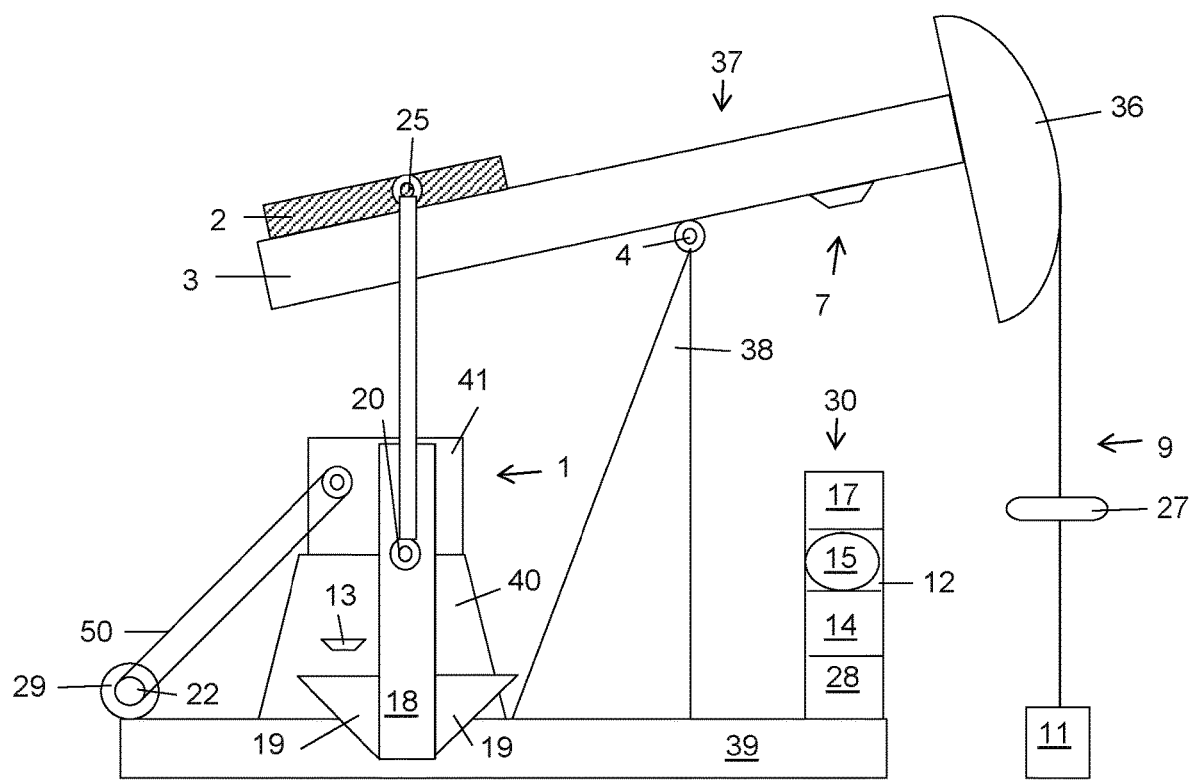
FIG. 3, moving effort force point positioning drive mounted top of beam with crank arm at 180 degrees.
Figure 7:
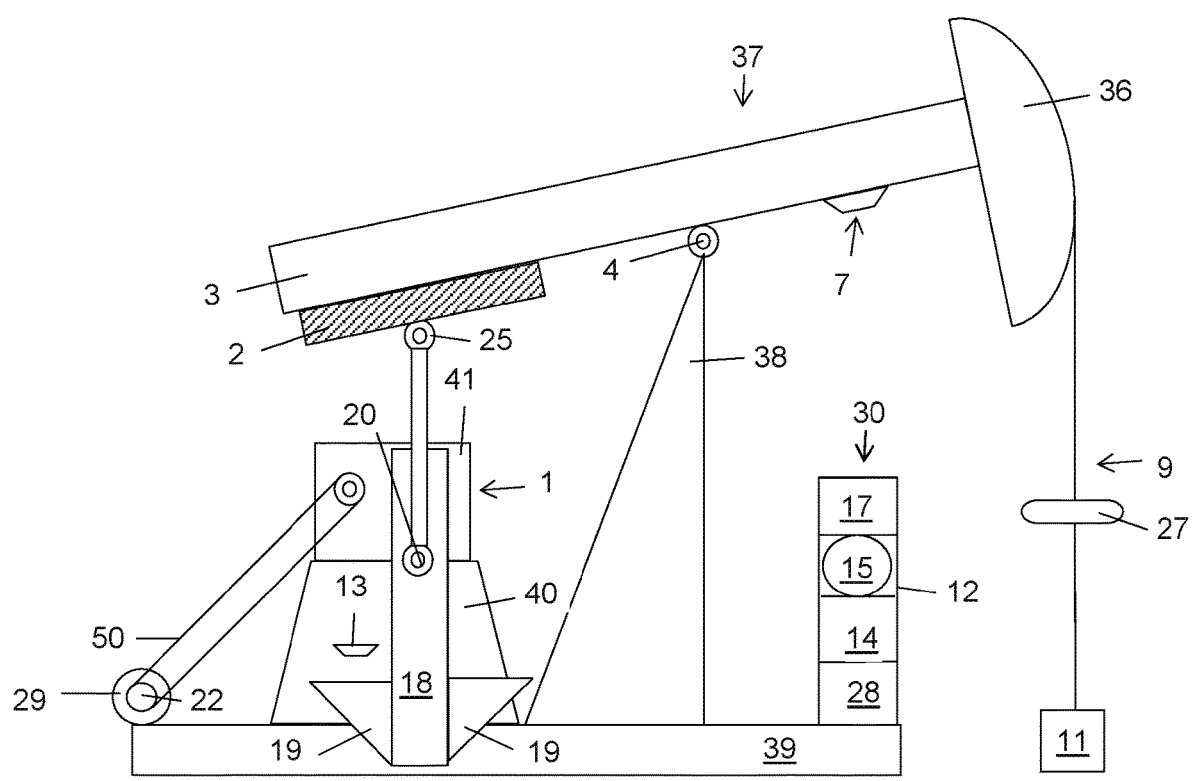
FIG. 7, moving effort force point positioning drive mounted bottom of beam with crank arm at 180 degrees.
Figure 8:
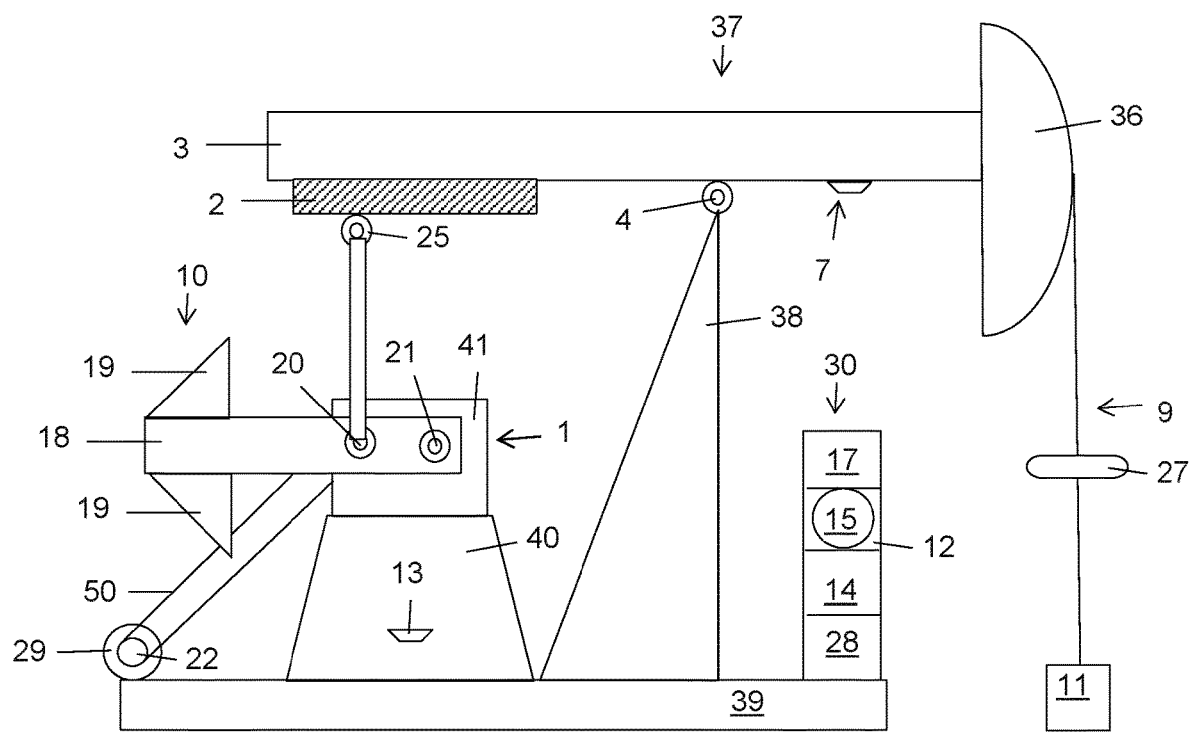
FIG. 8, moving effort force point positioning drive mounted bottom of beam with crank arm at 270 degrees.

FIG. 3 and FIG. 7 illustrates an embodiment that when crank arms 18 are straight down at 180 degrees, which is the position of low torque factor, and moving effort force point 25 is neutrally positioned near the middle of it's range and wherein front end (i.e. the end nearest well 11) of beam 3 is as high as it will go at or about 180 degrees crank angle and is about to re-start the cycle of reciprocating downward. At that moment, moving effort force point 25 begins moving away from near the middle of it's range and is timed to maintain near verticality with the crank pin and arrive at the end of it's range when crank arm 18 reaches near horizontal at either 90 degrees in FIG. 2 and FIG. 6 or 270 degrees in FIG. 4 and FIG. 8 to achieve maximum effective offset to the high torque factor in helping to rotate the crank weight. Then, crank arms 18 continue rotating and moving effort force point 25 starts moving back to neutral near the middle of it's range, where it is preferably timed to arrive in neutral near the middle of it's range when crank arms 18 are straight up at or 0 degrees in FIG. 1 and FIG. 5.

One method to calculate timing with position selection apparatus comprised of at least one of a vector logic circuit and a moving effort force point 25 position circuit is: Distance from middle of effort range to front moving effort force point position/seconds elapse between 90 degree crank positions=feet per second (fps) moving effort force point 25 speed.

Figure 5:
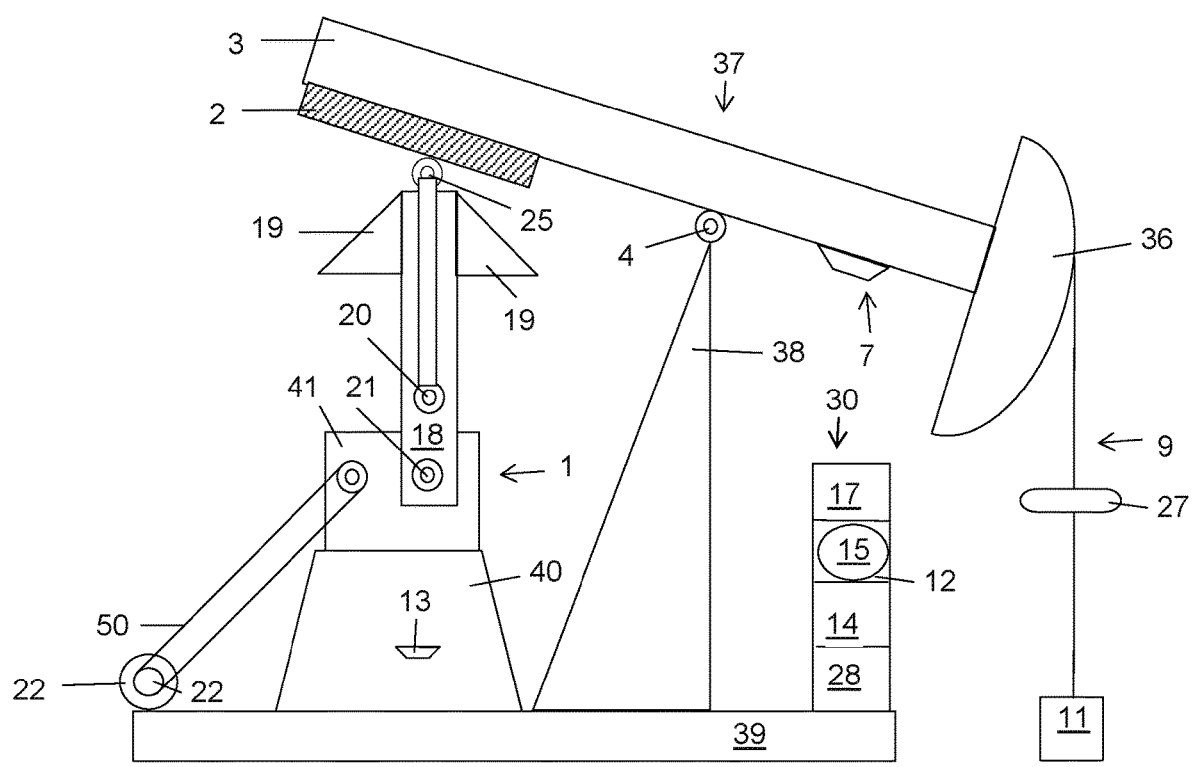
FIG. 5, moving effort force point positioning drive mounted bottom of beam with crank arm at 0 degrees.
Figure 6:
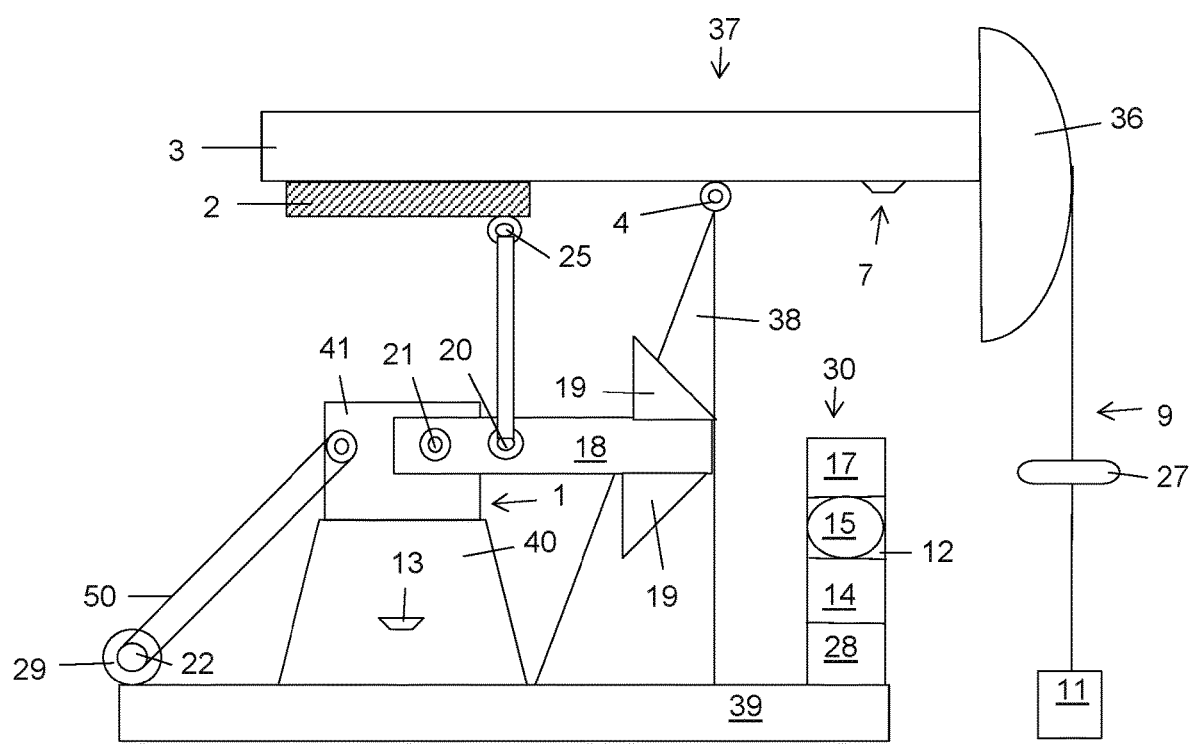
FIG. 6, moving effort force point positioning drive mounted bottom of beam with crank arm at 90 degrees.

Distance from middle of effort range of motion to rear moving effort force point 25 position/seconds elapse between 90 degree crank positions=feet per second moving effort force point 25 travel speed Example: 10'/2 seconds=5 feet per second (fps) moving effort force point 25 travel speed FIG. 1 and FIG. 5 illustrate that continuing the cycle when crank arms 18 are straight up at 0 degrees, which is the position of low torque factor, moving effort force point 25 is preferably neutrally positioned near the middle of it's range of motion and the rear end of beam 3 is as high as it will go and so will re-start the cycle of reciprocating downward. At that moment, moving effort force point 25 preferably begins moving away from neutral near the middle of it's range of motion and begins moving toward the end of it's range of motion and is preferably timed to to maintain near verticality with the crank pin 20 and arrive at the end of it's range of motion when crank arm 18 reaches near horizontal either 90 degrees in FIG. 2 or 270 degrees in FIG. 6 to achieve maximum counterbalance effect to offset high torque factor in helping to rotate the crank weight 10. Then, crank arms 18 continue rotating and moving effort force point 25 starts sliding back to neutral, near the middle of it's range of motion, where it is timed to arrive when the crank arms are straight down at 180 degrees in FIG. 3 and FIG. 7.

Figure 11:
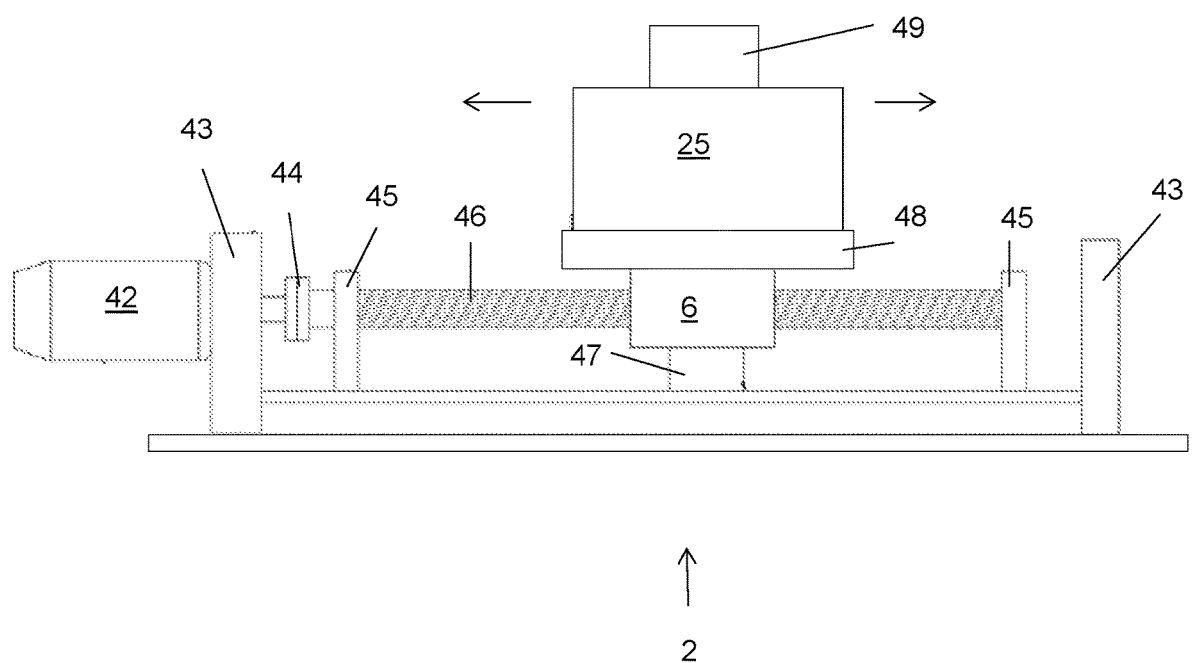
FIG. 11, motorized screw bolt drive.
Figure 12:
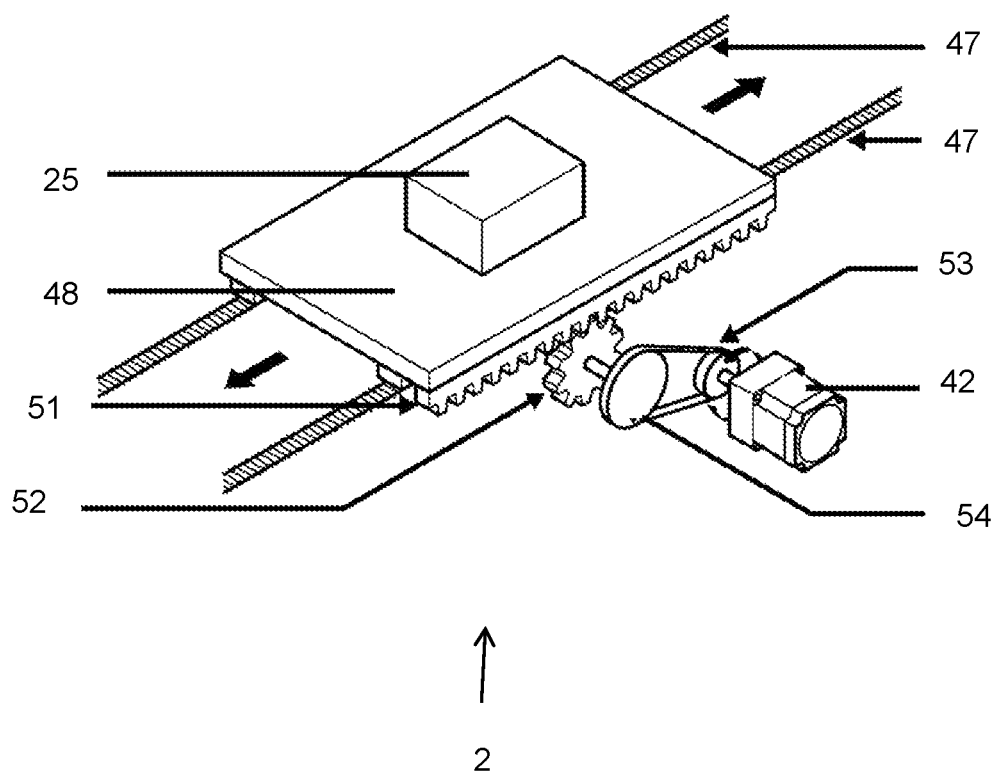
FIG. 12, rack and pinion drive.

Embodiments of the moving effort force point 25 positioning drive 2 can include, but are not limited to two opposing single acting rodless cylinders, tandem double-acting pneumatic cylinders for extended length in FIG. 9; double-acting hydraulic cylinder with a hydraulic pump and return reservoir; motorized lead screw bolt in FIG. 11, ball screw, or rack and pinion gear drive in FIG. 12; magnetic field propulsion; electro magnetism; an electric motor, a reciprocating electric motor; linear motor or servo motor with encoder; cable pullers, chain pullers, and/or belt pullers, with a series of pulleys configured to actuate with beam 3; and other mechanical means consisting of gears, cables, chains, belts, and electric or magnetic drive.

In one embodiment the movement of moving effort force point 25 is preferably caused by a double-acting pneumatic rodless cylinder in FIG. 9 of a cylinder positioning drive 16 when the weight is sufficiently low for pneumatic actuation. Sensors on cylinder positioning drive 16 can be magnetic to achieve spot positioning as cylinder passes or transducer type sensors for more continuous positioning signals. Air valves 33 with nomenclature, for example a 4/2 and 5/2 on cylinder positioning drive 16 open and close as calculated and are instructed to actuate a cylinder of positioning drive 16 to move moving effort force point 25 into position on beam 3 as computed by programmable system logic controller 14. For example, the moment the rodless pneumatic piston 6 passes by a magnetic sensor on the rodless piston carriage 5 a signal indicating that spot position can be sent to the programmable system logic controller 14. Or reaching the end of the range of motion can be sensed and it can then be programmed to reverse and return. Or adding transducers on the rodless piston carriage 5 can detect and measure variations in current and/or voltage which can be converted to signals that indicate the real time rodless pneumatic piston position and speed in the carriage 5. Also speed control muffler, quick exhaust valves, needle valve and flow control fittings can control pneumatic speed. And potentiometer, hall effect sensor, motor controller, lead switch, and limit switch can be used for linear actuator and servo motor position control.

Moving effort force point 25 movement can be controlled by using basic reversal controls coordinated with beam position. In one embodiment, an apparatus and/or system to monitor movement and achieve position control of moving effort force point 25 moving from at or near one or both ends of range of motion can be accomplished by obtaining readings of power use by prime mover 29 by ammeter 17 sent to programmed system logic controller 14 to send signals to valves 33 on a rodless cylinder of cylinder positioning drive 16 to which moving effort force point 25 is connected, for positioning moving effort force point 25 to maintain ammeter 17 reading nearest to a low amperage reading throughout the complete reciprocating cycle.

In a redundant configuration, an optimum position of moving effort force point 25 on beam 3 to achieve a reduction in torque factor and net torque 1 can be computed by programmed system logic controller 14 interpreting input data which can include from load cell 27 communicably coupled to load 9, an inclinometer 7 sensing angle of beam 3, transducers 22 and magnets on prime mover 29, sensor 13 on the pumping unit structure sensing crank angle and strokes per minute, and/or signals from magnets or transducers on positioning drive 2. The signals from one or more sensors and load cell 27 are preferably interpreted by programmed system logic in controller 14 to compute optimum lowest value of at least one of the power required of a prime mover and the amount of net gear torque in in the speed reducer 41 by positioning moving effort force point 25, most preferably based on information from measurements, which can include, but is not limited to calculations using wave equation and inserted into a machine learning algorithm program.

One embodiment of the present invention uses programmable system logic controller 14 that processes the previously described measurements and provides them to a sending unit so that the machine learning algorithm communicates instructions to the drive mechanism to control the position of moving effort force point 25 continuously. In this embodiment, programmable system logic controller 14 can, for example, be programmed with the machine learning algorithm such that it will continually process new readings, parameters, and measurements and continually, in real time or near real time, send positioning instructions to positioning drive 2 to position moving effort force point 25 in order to reduce at least one of the power required of a prime mover and the amount of net gear torque 1 in in the speed reducer 41. These measurements can be based on the reduced effective amount of load 9 and effective crank weight load at moving effort force point 25. In one embodiment, a series of downhole measurements, including but not limited to those from load cell 27 on well 11, can be input into programmable system logic controller 14. Another input can optionally include a position of crank arm 18, which can optionally be obtained, at least in part, based on measurements from sensors 13, which can include magnetic transducers, on the pumping unit structure. Other inputs can optionally include the position of beam 3 based on inclinometer 7; ampere measurements from ammeter 17, for embodiments wherein prime mover 29 comprises an electric motor; from vacuum readings for embodiments wherein prime mover 29 comprises an internal combustion engine; and/or one or more measurements stored in memory module 12 for programmable logic controller 14. In one embodiment, display 15 is preferably provided and can be operatively connected to memory module 12 and/or programmable system logic controller 14 for displaying a series of measurements stored in memory module 12 for system logic controller 14, and/or for displaying indicia of one or more values from any other sensor or combinations of sensors used.

In one embodiment, machine learning algorithm can be processed using system controller 30. System controller 30 preferably sends positioning instructions to positioning drive 2—most preferably in real time or near real time. Processed instructions to positioning drive 2 selectively positions moving effort force point 25 so that the position of moving effort force point 25 causes reduced torque factor and net torque 1 as the result of reduced effective load 9 and then also reduced effective crank weight load 10 at moving effort force point 25. System controller 30 preferably includes a programmable system logic controller 14 that is most preferably programmed with a machine learning algorithm and allows the continuous processing of new readings, parameters, and measurements. System controller 30 also preferably includes a sending unit that communicates the processed data to a positioning selection mechanism that is preferably communicably coupled to positioning drive 2, which positions moving effort force point 25 in accordance with the instructions to maintain verticality with the crank pin 20.

In one embodiment, the machine learning algorithm can be processed by system controller 30 with an input for a series of downhole measurements. These inputs can include but are not limited to inputs from load cell 27 on well 11; crank arm 18 position measurements—for example from magnets with sensors 13 mounted on the pumping unit structure; position of beam 3 from inclinometer 7; ampere measurements from ammeter 17, for embodiments wherein prime mover 29 is an electric motor, and/or vacuum readings for embodiments wherein prime mover 29 is an internal combustion engine.

In one embodiment, the machine learning algorithm can be processed by a measurement input that can store a series of measurements in memory module 12 for programmable system logic controller 14.

In one embodiment, system controller 30 can process the series of measurements stored in memory module 12 for system logic controller 14 with a machine learning algorithm such that display 15 is operatively connected to the system controller with memory module 12 and programmable system logic controller 14.

The rotational motion of crank arms 18 cause a maximum moment of rotary crank weights 19, crank shaft 21 and crank pins 20 about crankshaft 21 in inch-pounds, which is nominally the maximum effective crank counterbalance at about 90 degrees or 270 degrees. And 90 degrees and 270 degrees is nominally the position of maximum torque and effective counterbalance. So when the programmed logic commands the position of moving effort force point 25 to maintain verticality with the crank pin 20, it is lowering torque factor and increasing effective crank counterweight 10 to offset the maximum amount of net torque 1 in the horizontal position to raise load 9, and, vice versa when commanded to maintain verticality with the crank pin 20 to raise the effective crank weight 10.

FIG. 9, in one embodiment, system positioning drive 16 preferably comprises a rodless cylinder, which preferably sits on top of beam 3.

Moving effort force point 25 is preferably disposed on top of positioning drive 16 with a cushion on each end to soften reversals. In one embodiment, movable component 6 of positioning drive 16 can comprise rodless element/piston, which can be magnetic and thereby securely attract metallic moving effort force point 25 to follow its movements.

FIG. 10, in one embodiment air pressure for double-acting rodless cylinder of positioning drive 16 can be supplied by any capable and/or suitable supply with an air hose 33 to reserve tank 32 and an air hose 33 to a valve such as 4/2 or 5/2 valve. In one embodiment, compressed air is preferably provided by an air compressor 8, which can optionally include beam actuated piston air compressor 31 powered by beam 3. In one embodiment, a double-acting single cylinder can be used as beam air compressor 31, and is preferably pivotably connected at its top by a cylinder bearing 24 to beam 3 and the lower extremity is preferably pivotably anchored with a piston foot bearing 23 connected to the beam pumping unit 37 structure. With this configuration, air can be compressed by beam 3 actuated piston air compressor 31 using power from beam 3 to move movable piston component 6 the length of cylinder positioning drive 16.

Of course other configurations of air compressors can be used and will provide desirable results, including but not limited to configurations in which the air compressor is connected by one or more belts to the pumping unit sheave being powered by prime mover 29 or to the sheave of prime mover 29 itself. Of course, motive power source 8, which can optionally be a compressed natural gas source and including but not limited to an air compressor, can be provided independent of prime mover 29. In one embodiment, the air compressor can include one or more rotary screw and/or reciprocating air compressors.

For embodiments that employ a double-acting hydraulic cylinder with a two-direction valve, the hydraulic pressure can be supplied from motive power source 8, which can optionally be a beam actuated piston hydraulic compressor 31 hydraulic pump, most preferably with a pressure relief and return reservoir 32.

If the beam pumping unit 37 is pumping a well 11 that produces natural gas then the natural gas can be separated and accumulated in the casing and then routed to actuate a double-acting rodless cylinder of positioning drive 16 and then returned to the natural gas sales line.

FIG. 11 illustrates an embodiment when movable component 6 of positioning drive 2 can comprise nut of screw 46 rotating with bearings 45 with coupling 44 to an electric motor 42, for instance a servo motor or stepper motor and encoder, held with a mount 43. Moving effort force point 25 with a position sensor 49 can be connected to a table 48 sandwiched between moving effort force point 25 and moving component 6 on slide 47.

FIG. 12 illustrates an embodiment when movable component 6 of positioning drive 2 can comprise rack 51 on guides 47 and pinion 52 with an electric motor 42, for instance a servo or stepper motor and encoder, which can be connected to a table 48 sandwiched between moving effort force point 25 and rack 51. Electric motor 42 can be a direct gear drive or use belt and motor pulley 53 and pinion pulley 54.

Moving effort force point 25 can be connected to the table 48 sandwiched between moving effort force point 25 and moving component 6 by bolt, rivet, weld, magnetism or other preferably removable fastener.

In one embodiment, the position on beam 3 of moving effort force point 25 is preferably precisely correlated and timed with the strokes per minute of beam 3 pump. Variable frequency drive 28 can slow the upward or downward speed of load 9 in mid stroke when moving effort force point 25 position causes reduced net torque 1. Variable frequency drive 28 with programmable system logic controller 14, which is preferably programmed for this application, can include a component of the preferred configuration. This is because desired strokes per minute of beam 3 can be controlled in coordination with data from load cell 27 via the chosen speed of prime mover 29. This configuration increases well management and is available when variable frequency drive 28 is integrated with a sensor package. This embodiment can allow a longer pump stroke without increasing torque 1 in the speed reducer 41 and prime mover 29 and can allow a slower pumping speed which is usually operationally desirable.

This moving effort force point 25 can be installed on already existing pump jacks at existing well installations by attaching positioning drive 16 to existing beam 3, or adapting any other workable method to move moving effort force point 25. Alternatively, moving effort force point 25 can be part of original equipment on newly manufactured reciprocal beam pumps. This may allow OEM design to have longer beam pump stroke lengths and smaller net torque 1 capacity speed reducers 41 than those prior to this invention. This is because of the increased efficiency with the moving effort force point 25 position effectively reducing the lifting and lowering torque factor and net torque 1. And, with those longer strokes possible, the pump jack can operate at slower strokes per minute, reduce tubing and rod wear, and also allow the use of lower horsepower prime mover 29. As such, pumping unit design can possibly be improved with longer stroke lengths and smaller speed reducers 41, to accommodate the benefits of embodiments of this invention.

Figure 4:
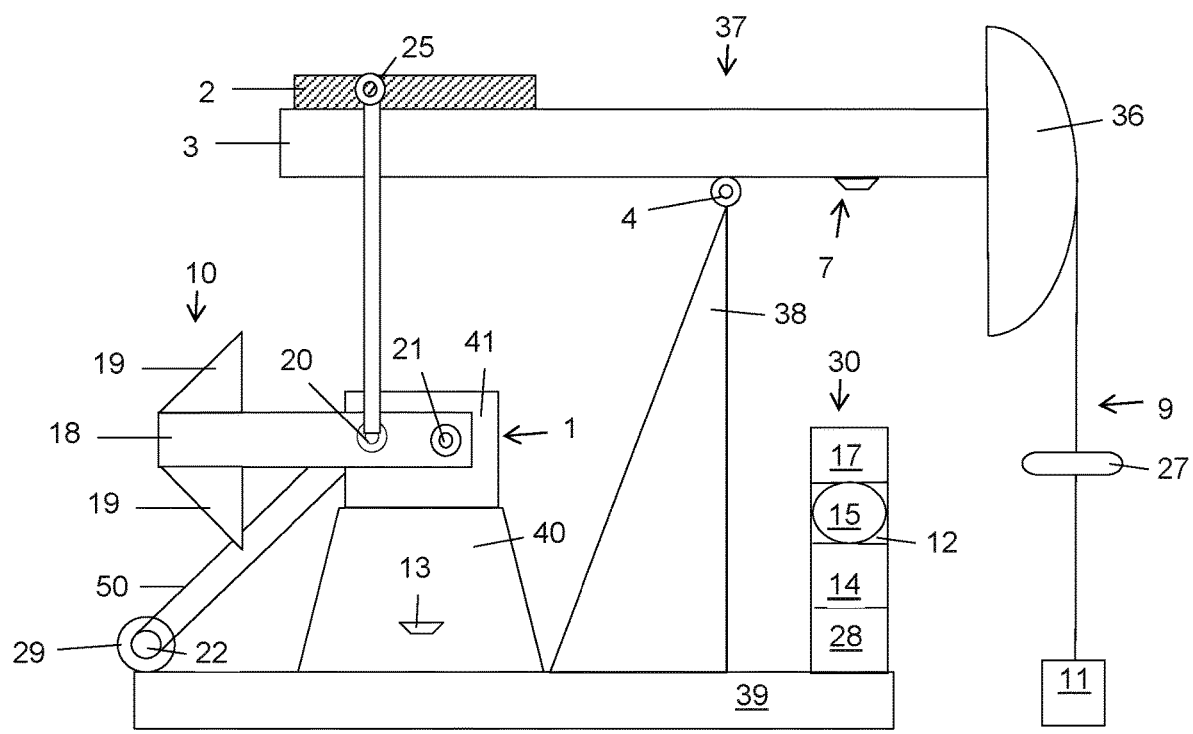
FIG. 4, moving effort force point positioning drive mounted top of beam with crank arm at 270 degrees.

Lowest speed reducer 41 net torque 1 loads on reciprocating beam 3 pumps occur at top and bottom of stroke, 0 degrees and 180 degrees FIG. 4, because of low torque factor from unit geometry. And with the current art nominal peak net torque 1 loads on speed reducer 41 occur at high torque factor 90 degrees FIG. 2 and FIG. 6 and 270 degree crank arm 18 angles FIG. 4 and FIG. 8 which are substantially equally high torque values when reciprocal beam 3 pump is operated normally in the current art.

Embodiments of the present invention can achieve reduced net torque 1 at 90 degrees and 270 degree crank arm 18 angles because of lower torque factor.

The following equations further describe an embodiment of the present invention:

$$\text{Net torque } (Tn) = 9.53 \times \text{kilowatt (kw)} \times \text{efficiency (eff)} / \text{strokes per minute (SPM)} \times \text{speed variation of power transmission } (SV).$$

Torque factor (TF) is used to convert polished rod load to torque (Nm).

$$\text{Torque due to net load } (TWN) = \text{torque factor (TF)} \times \text{load } (N).$$

$$\text{Net load } (N) = \text{load } (W) - \text{unit unbalance } (SU).$$

In one embodiment, consider:

$$\text{Pressure } (P) = \text{Force } (F) / \text{Area } (A).$$

$$\text{Force } (F) = \text{Pressure } (P) \times \text{Area } (A).$$

Load×Distance from tipping point=Counterweight Mass× Distance from tipping point and is called load moment.

A "Rule of thumb" for top of the head calculation in the field:

$$\text{ECB (effective counterbalance)} \sim \text{Buoyant weight of rods} + \tfrac{1}{2} \text{ fluid load on pump plunger.}$$

The "Permissible Load" is the polished rod load necessary to give a resultant net torque equal to the API rating of the reducer with a certain amount of counterbalance. This load should be calculated for each 15 degree crank position. The formula used for this calculation is $$W \text{ (Permissible Load)} = \text{Net Torque} - M \cos \theta / TF$$

where:
Net Torque=API rating of the gear reducer
M=Counterbalance torque at 90° or 270° (Determined by counterbalance requirements for a particular pumping application)
θ=Crank Angle
W=Permissible Load (Polished rod load required to give net torque equal to rating of the gear reducer)
Net torque for a pumping unit is calculated by the following API formula:

$$\text{Net Torque} = (TF)(W) - (M \cos \theta)$$

where:
TF=Torque Factor
W=Polished Rod Load
M=Counterbalance Torque at 90° or 270°
θ=Angle of crank, starting with 0° at vertical position and reading clockwise.

Net torque can be found by this formula when polished rod load, counterbalance torque and crank angle are known. The formula is used to find net torque from dynamometer cards.

The foregoing embodiments have been presented for the purposes of illustration and description. They are not intended to be exhaustive or to limit the invention and method of use to the precise forms disclosed. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims. Although the foregoing discussion describes the most preferred locations of moving effort force point 25 at various times in the pumping cycle, it is important to understand that such preferred locations are merely described for illustration purposes and desirable results can be achieved when moving effort force point 25 is in approximately such locations with respect to lever 3.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An effort force point moving in real time on a length of walking beam comprising:
    said effort force point moving in real time, a load, a fulcrum;
    the effort force point moving in real time pivotably connected to a rotating crank arm surrounding a crank shaft;
    said crank arm pivotably connected to a crank pin providing a means for a radius from the crank shaft; and
    the effort force point moving in real time moving forward and aft to be disposed substantially vertical with said crank pin.

2. An effort force point moving in real time on a length of walking beam of claim 1, whereby:
    said moving effort force point maintains a substantially vertical relationship with a pivotably connected crank pin; and
    the moving effort force point pivotably connected to the said crank pin such that a crank arm provides a means for reciprocating said walking beam.

3. An effort force point moving in real time on a length of walking beam of claim 1, whereby:
    a substantially vertical relationship with pivotably connected crank pin provides a means for a low torque factor;
    the low torque factor provides a means for reducing at least one of the power required of a prime mover and the amount of net gear torque in the speed reducer;
    the low torque factor provides a means for reducing required counter balance; and
    the low torque factor provides a means for increasing permissible load.

4. An effort force point moving in real time on a length of walking beam of claim 1, whereby a substantially vertical relationship with pivotably connected crank pin provides a means for:
    faster speed of vertical load displacement when the moving effort force point is disposed forward of effort and speed reducer output speed is substantially constant;
    longer distance of vertical load displacement when the moving effort force point is disposed forward of effort;
    slower speed of vertical load displacement when moving effort force point is disposed aft of effort and speed reducer output speed is substantially constant; and
    shorter distance of vertical load displacement when the moving effort force point is disposed aft of effort.

5. An effort force point moving in real time on a length of walking beam claim 1, further including:
    an effort force point positioning drive; and
    the effort force point positioning drive disposed at least one of above and below the walking beam.

6. An effort force point moving in real time on a length of walking beam with an effort positioning drive of claim 5, whereby said effort positioning drive comprises a pneumatically-powered effort positioning drive.

7. An effort force point moving in real time on a length of walking beam with an effort positioning drive of claim 5, whereby said effort positioning drive comprises a hydraulically-powered effort positioning drive.

8. An effort force point moving in real time on a length of walking beam with an effort positioning drive of claim 5, whereby said effort positioning drive comprises a rodless piston.

9. An effort force point moving in real time on a length of walking beam with an effort positioning drive of claim 5, whereby said effort positioning drive comprises a double-acting rodless piston.

10. An effort force point moving in real time on a length of walking beam with an effort positioning drive of claim 5, whereby said effort positioning drive comprises a rack and pinion moving effort force point positioning drive.

11. An effort force point moving in real time on a length of walking beam with an effort positioning drive of claim 5, whereby said effort positioning drive comprises a lead screw counterweight positioning drive.

12. An effort force point moving in real time on a length of walking beam with an effort positioning drive of claim 5, whereby said effort positioning drive comprises at least one of a means of actuation; an actuator; two opposing single acting rodless cylinders; tandem double-acting pneumatic cylinders; ball screw; magnetic field propulsion; electro magnetism; electric motor; encoder; gears; cables; chains; belts.

13. An effort force point moving in real time on a length of walking beam with an effort positioning drive of claim 5, whereby said effort positioning drive comprises:
    a system controller logic with a sensor configured to sense at least one of the power required of a prime mover and the amount of net gear torque in a speed reducer;
    the system controller logic programmed to achieve lowest power required of the prime mover and the amount of net gear torque in the speed reducer; and
    the system controller logic with variable frequency drive.

14. An effort force point moving in real time on a length of walking beam with an effort positioning drive of claim 13, whereby:
system controller logic is configured to provide a means for said moving effort force point to be disposed by said effort positioning drive such that a downward force substantially vertical to a crank pin exerts on a rear portion of the walking beam during an upstroke of a beam pumping unit, a rear-portion of the walking beam being an opposite end-portion of the walking beam from a head of the beam pumping unit.

15. An effort force point moving in real time on a length of walking beam with the positioning drive of claim 13, whereby:
system controller logic is configured to provide a means for said moving effort force point to be disposed by said effort positioning drive such that an upward force substantially vertical to a crank pin exerts on a rear portion of the walking beam during a down stroke of the beam pumping unit, a rear-portion of the walking beam being an opposite end-portion of the walking beam from a head of the beam pumping unit.

16. An effort force point moving in real time on a length of walking beam with a positioning drive of claim 13, whereby:
- system controller logic in a variable frequency drive configured to modulate a vertical load displacement speed when moving effort force point travels forward; and
- system controller logic in a variable frequency drive configured to modulate the vertical load displacement speed when moving effort force point travels rearward.

17. A torque-reducing effort force point moving in real time method for reducing net torque required to drive an unbalanced down hole lever-type beam pumping unit, the method comprising:
- determining weight of downhole load on the beam pumping unit, having a load connected thereto, with a sensor;
- positioning the effort force point moving in real time to be substantially vertical with a crank pin to allow an upward force on a walking beam of the beam pumping unit;
- positioning the effort force point moving in real time to be substantially vertical with the crank pin to exert a downward force on the walking beam of the beam pumping unit; and
- repositioning the effort force point moving in real time during a single pumping cycle, wherein repositioning the effort force point moving in real time comprises forward and aft movement timed to be substantially vertical in relation with the rotating crank pin.

18. A torque-reducing effort force point moving in real time method of claim 17, whereby:
- repositioning the effort force point moving in real time comprises actuating a effort force point moving in real time positioning drive; and
- repositioning the effort force point moving in real time provides a means for a low torque factor.

19. A method to reduce torque comprising:
- an effort force point moving in real time, a load, a fulcrum;
    - said effort force point moving in real time positioned to reduce torque;
        - a torque reducing geometric relationship of effort force point moving in real time position to motive force; and
        - a substantially vertical geometric relationship of effort force point moving in real time position to motive force.

\* \* \* \* \*